No. 878,460. PATENTED FEB. 4, 1908.
H. GREER, Jr. & J. R. THOMPSON.
EXCAVATOR.
APPLICATION FILED MAY 27, 1904.
5 SHEETS—SHEET 2.
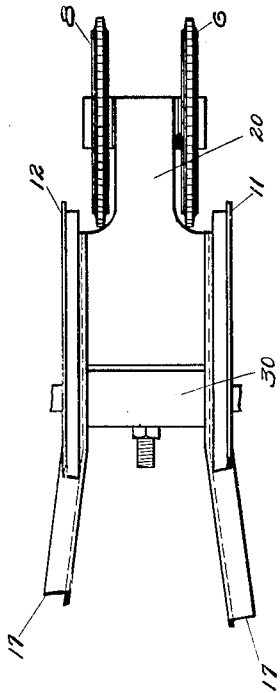
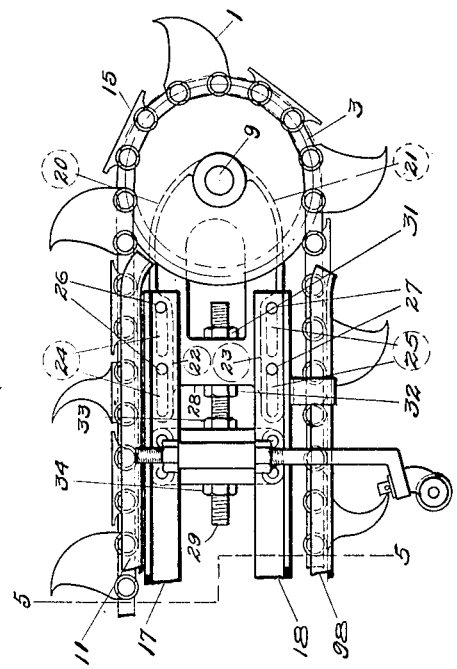
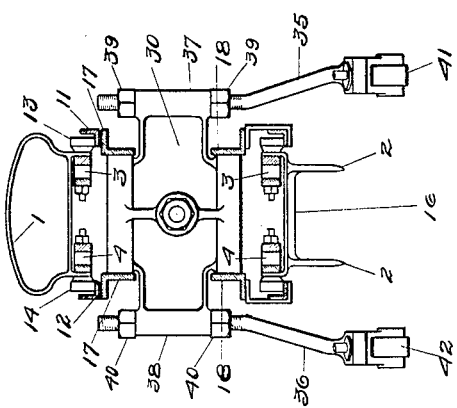
WITNESSES:
INVENTORS
ATTORNEYS

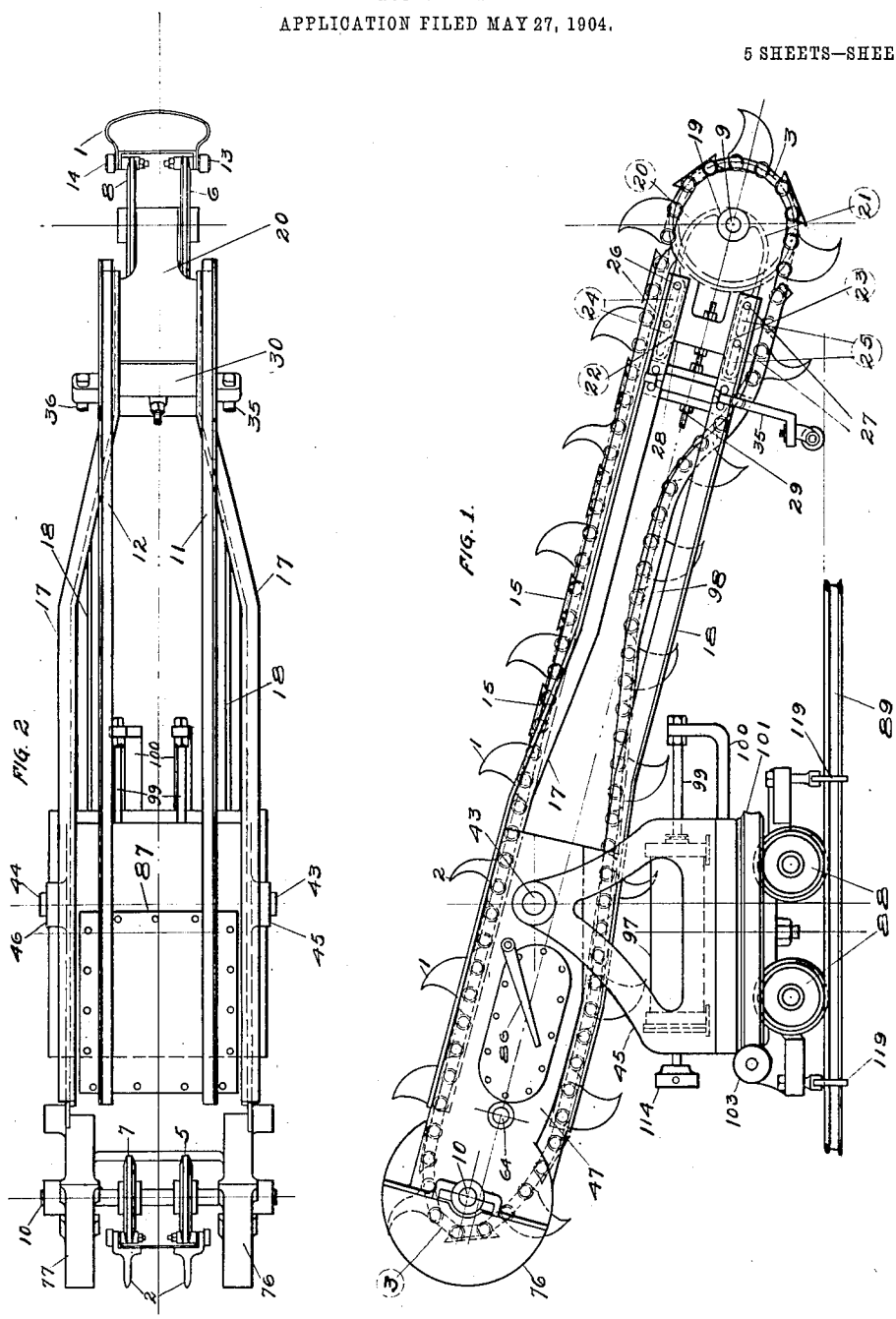

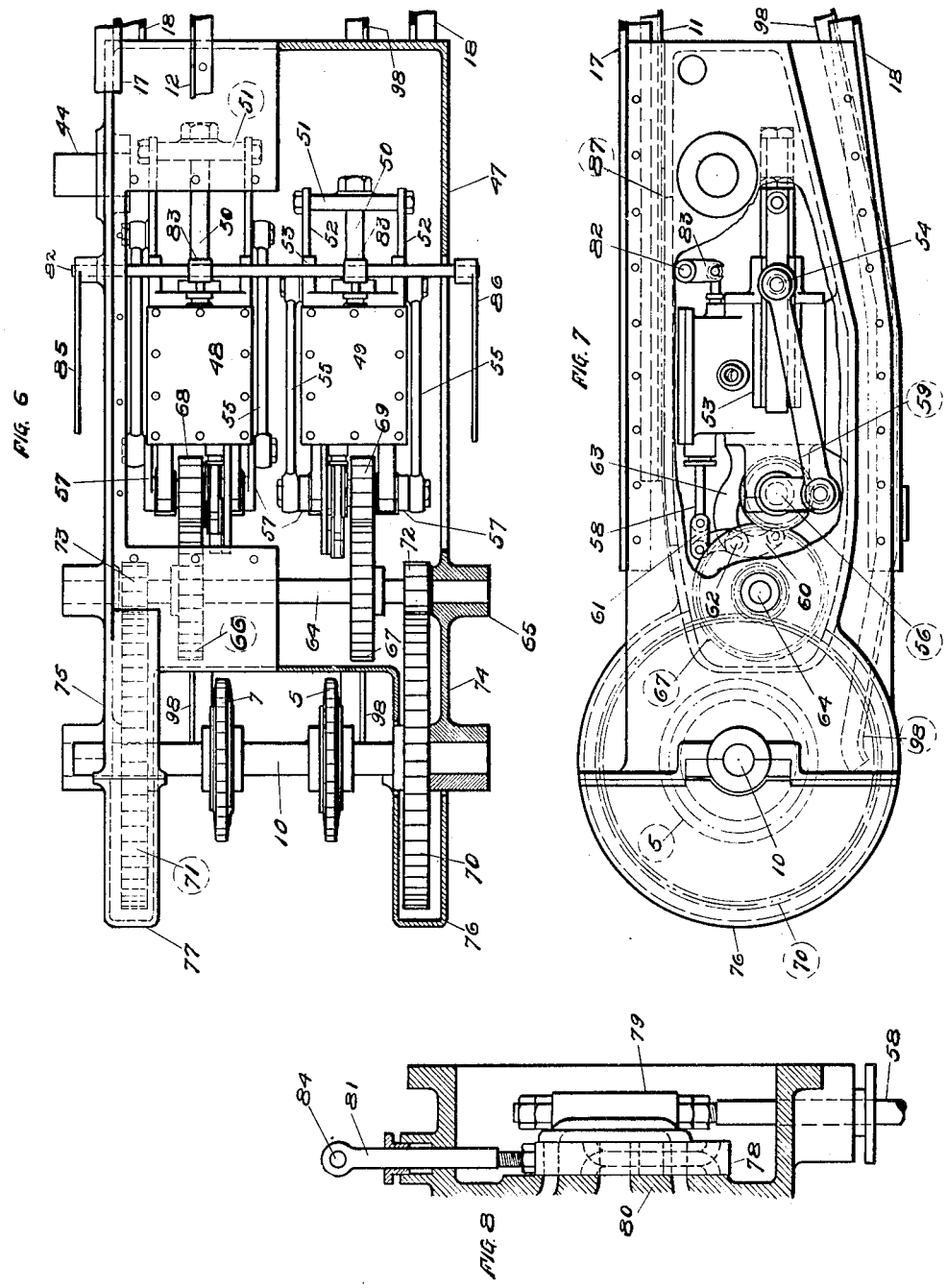

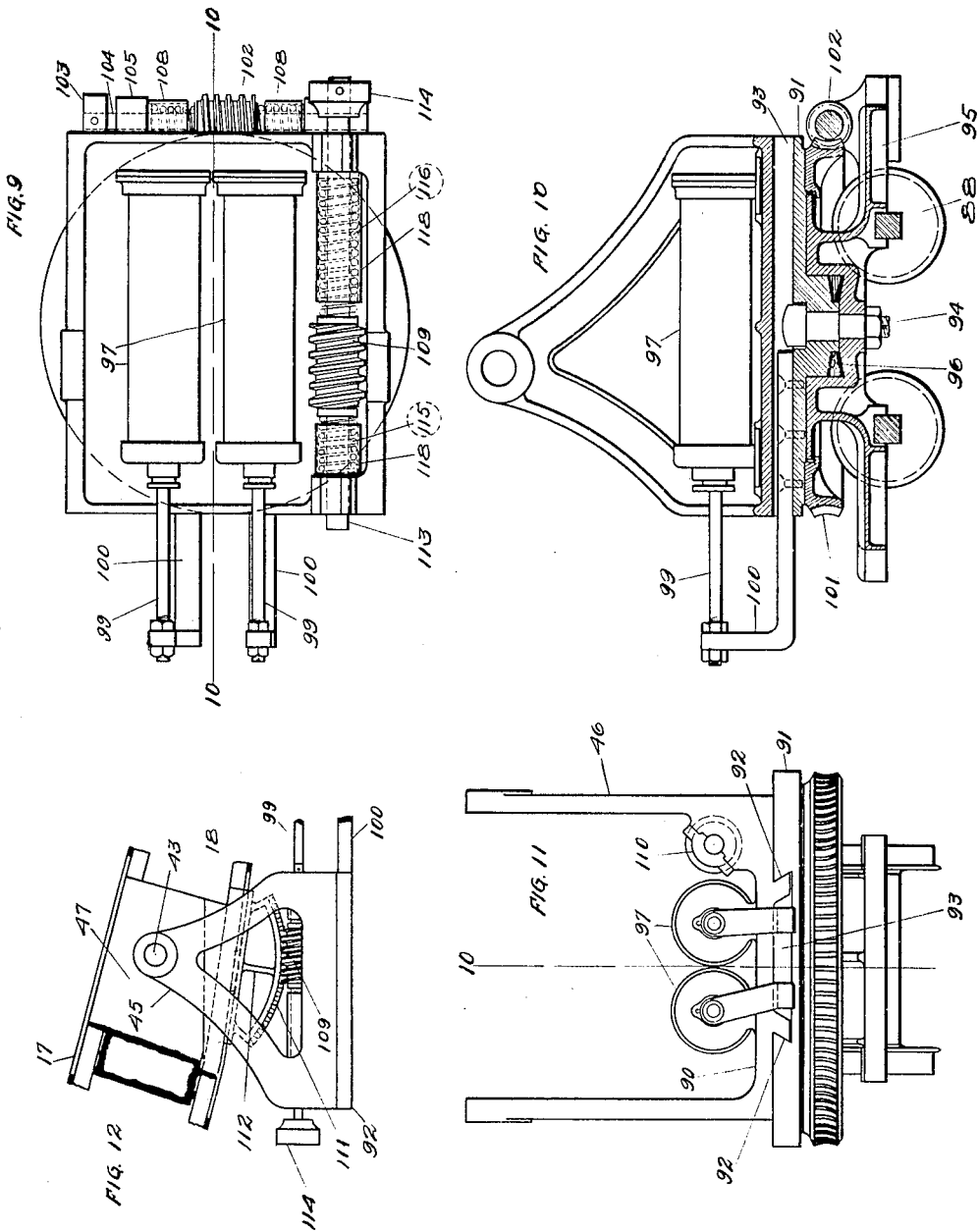

No. 878,460. PATENTED FEB. 4, 1908.
H. GREER, Jr. & J. R. THOMPSON.
EXCAVATOR.
APPLICATION FILED MAY 27, 1904.

5 SHEETS—SHEET 5.

WITNESSES:
INVENTORS
ATTORNEYS

UNITED STATES PATENT OFFICE.

HOWARD GREER, JR., OF CHICAGO, ILLINOIS, AND JAMES R. THOMPSON, OF IRONWOOD, MICHIGAN.

EXCAVATOR.

No. 878,460.  Specification of Letters Patent.  Patented Feb. 4, 1908.

Application filed May 27, 1904. Serial No. 210,003.

*To all whom it may concern:*

Be it known that we, HOWARD GREER, Jr., and JAMES R. THOMPSON, citizens of the United States, residing at Chicago, in the county of Cook and State of Illinois, and Ironwood, county of Gogebic, State of Michigan, respectively, have invented certain new and useful Improvements in Excavators, of which the following is a full, clear, and exact specification.

Our invention relates to excavators, and more particularly to that type of excavators employed for underground use, as in mining and other uses where the space for the accommodation of the machine is necessarily limited, and the invention has for its primary object to provide an excavator which shall be compact, powerful and efficient, and especially adapted for use in a horizontal or substantially in a horizontal position.

With these ends in view, our invention consists in certain features of a novelty in the construction, combination and arrangement of parts by which the said object and certain other objects hereinafter appearing are attained, all as fully described with reference to the accompanying drawings and more particularly pointed out in the claims.

Figure 15:
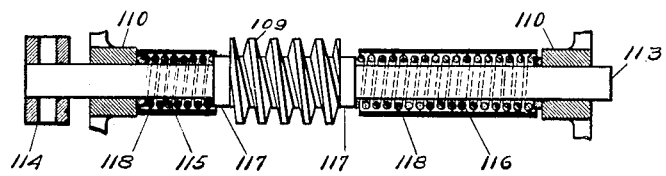
Figure 16:
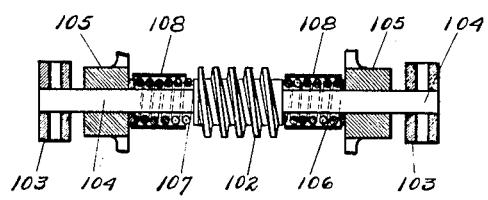
Figure 13:
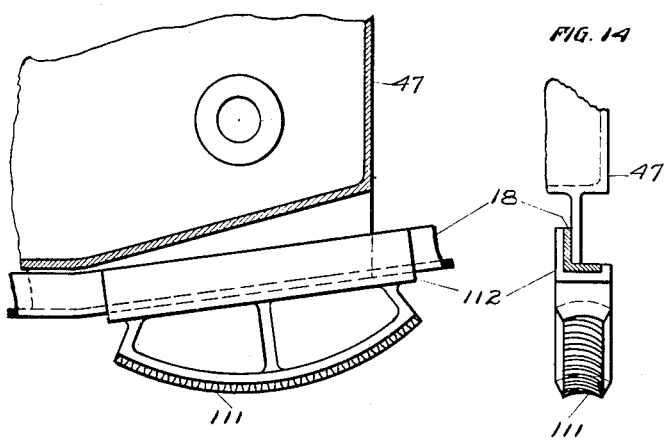
Figure 14:
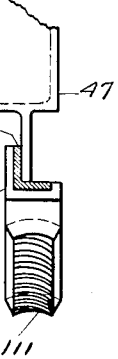

In the said drawings,—Figure 1 is a side elevation of our improved machine. Fig. 2 is a plan view thereof with the upper side of the conveyer removed or broken away. Fig. 3 is a detail plan view of the lower end of the excavator boom or frame with the excavator removed. Fig. 4 is a side elevation thereof with the excavator in place. Fig. 5 is a cross-section on the line 5—5, Fig. 4. Fig. 6 is an enlarged detail plan view of the upper end of the excavator frame or boom showing the engines uncovered and the gear casing partly in longitudinal section. Fig. 7 is a side elevation thereof with the side of the frame broken away disclosing the engines. Fig. 8 is an enlarged detail sectional view of the slide valve and reversing block preferably employed for reversing the engines. Fig. 9 is a plan view of the truck. Fig. 10 is a vertical section thereon taken on the line 10, 10, Figs. 9 and 11. Fig. 11 is an end view thereof. Fig. 12 is a detail side elevation of the segment rack and worm and connected parts for oscillating the boom or excavator frame on its horizontal axis. Fig. 13 is an enlarged detail view of said segment and a part of the frame, the former in side elevation and the latter in vertical section. Fig. 14 is an end or edge view thereof. Fig. 15 is a longitudinal sectional view of the cushioning devices for said worm, and Fig. 16 is a similar view of the cushioning devices for the worm which turns the boom on its vertical axis.

1, represents a series of buckets or other suitable excavating devices adapted to enter and lift the earth or other matter to be removed, and if desired, a number of picks or teeth 2 may be interposed between the buckets 1 at suitable intervals for breaking up the hard earth, catching and lifting boulders and generally clearing the way for the buckets 1. These buckets and picks are mounted on and secured to two endless belts which constitute therewith an endless conveyer or excavator. These belts are preferably in the form of two endless sprocket chains 3, 4, and are mounted upon sprocket wheels 5, 6, 7, 8, the sprockets 6, 8 being idlers mounted upon a shaft 9, and the sprockets 5, 7 being driven and mounted upon a shaft 10 and these two shafts are journaled respectively in the longer and shorter ends of a substantially horizontal boom or frame carrying ways or guides 11, 12 for the upper folds of the chains 3, 4, respectively, and by which guides these folds are prevented from sagging under the weight of the buckets and picks and their contents while passing in a substantially horizontal or slightly inclined direction from the longer towards the shorter end of the excavator frame, and for the purpose of reducing the friction thus occasioned to the minimum, the links of the chains may be provided with anti-friction rollers 13, 14 respectively, which rest on the ways 11, 12. The buckets 1 and picks 2 gather and receive their contents while passing from a position under the lower sprocket wheels 6, 8, and turn over on their sides while passing substantially horizontally to the upper end of the excavator frame where they dump their contents, and consequently more or less of the material received while rising from their lower to their upper position around the sprockets 6, 8 will spill out, but in order that this percentage of the contents may not be lost, and that the chains 3, 4 may be protected from the deleterious effects thereof, the chains at points between the buckets and between the buckets and picks are provided with shields 15, which fill the spaces between these members as completely as practicable and thus serve to catch the spilling material and to protect the joints of the links from grit. As shown in Fig. 5, the picks 2 are arranged in pairs and these may be formed on or connected to similar shields 16 which fill the spaces between the two picks of each pair and also between the picks and the adjacent shields 15.

The excavator frame or boom before referred to is composed of two side frames, and these are duplicates of each other and each consists of upper and lower angle bars 17, 18, or other suitable members possessing requisite rigidity, and to which the guide ways 11, 12 are secured at their lower ends. On the lower ends of these angle bars 17, 18, the sprocket wheels 6, 8 are mounted preferably with capability of adjustment, and to that end the shaft 9 of the sprocket wheels is journaled directly in a supplemental frame member comprising a journal bearing 19 connected by two curved arms 20, 21, with side flanges 22, 23 respectively, which respectively fit against the two angle bars 17 at the top and 18 at the bottom, and are provided with slots 24, 25 through which pass bolts 26, 27 which secure these side flanges 22, 23 to the bars 17, 18 respectively with capability of longitudinal adjustment whereby the slack of the chains may be taken up at will. In order, however, that the requisite power may be applied for thus adjusting the sprockets 6, 8, the arms 20, 21 are connected together by a cross-bar 28 through which passes one end of an adjusting screw 29 whose other end passes through a cross-bar 30 which is rigidly bolted or otherwise connected to the four angle bars 17, 18 as shown in Figs. 1, 2, 4 and 5, and this adjusting screw 29 is provided at both sides of the cross-bar 28 with nuts 31, 32 and at both sides of the cross-bar 30 with nuts 33, 34 so that the adjustment may be effected and the parts rigidly locked in position.

The ends of the cross-bar 30 are extended beyond the angle bars 17, 18 as shown in Fig. 5 and are utilized for the attachment of two legs or supports 35, 36 which serve as gages for regulating the depth of cut of the buckets and picks. The attachment between the cross-bar 30 and these legs is effected by passing the upper ends of the legs through bosses 37, 38 on the cross-bar and securing them by nuts 39, 40 which provide for their vertical adjustment. The lower ends of the legs, if desired, may be provided with rollers 41, 42 for better supporting them upon the ground.

The angle bars 17, 18 at their upper ends diverge from the guide-ways 11, 12 as shown in Fig. 2 and are rigidly secured to the sides of the engine casing which constitutes in effect a part of the excavator frame or boom, and the sides of which casing are provided with trunnions 43, 44 mounted in the two side members 45, 46 of a suitable carriage frame and by means of which trunnions the entire frame or boom and engine casing are pivoted on a horizontal axis so that the lower end of the boom or frame may be manipulated in a vertical plane as desired. The engine casing is best shown in Figs. 6 and 7 and it comprises a box like member 47 of any form best suited to the shape of the engines or other motive power to be situated therein for driving the sprockets 5, 7. In this exemplification of our invention, we have shown and prefer to employ two reciprocating engines 48, 49 arranged side by side in the casing 47, as shown in Fig. 6.

The engines 48, 49 are duplicates and a description of one will suffice for both. Each is provided with the usual piston rod 50 having a cross-head 51 to which is secured a pair of guide-rods 52 held in suitable ways 53 formed on or secured to the sides of the engine cylinder, and projecting outwardly from each of these guide-rods is a cross-head pin 54 by the aid of which the cross-head is connected through the intermediary of suitable pitmen 55 with the crank shaft 56 which is arranged at the back end of the cylinder or end opposite that through which the piston rod 50 projects, and it is provided with two cranks 57, which of course are set together or on the same degree. The valve rod 58, however, projects through the rear end of the steam chest and is actuated by an eccentric 59 on shaft 56 through any suitable operative connection, such as a lever 60 and a link 61 connecting one end of the lever to the rod 58, the lever being pivoted at 62 in any suitable bracket 63. By this construction and arrangement of engine, it will be seen that we reduce the space necessary for the engine to the minimum, making it short and compact, and we also equalize the strain on the piston rod by its double connection. The engines are set very close together as appears in Fig. 6, in fact much closer than would be feasible to place these engines and at the same time have the two contiguous pitmen 55 connected to different cranks as is necessary or desirable since the cranks of one engine are set forty-five degrees in the lead of those of the other, as appears in Fig. 6. In order, however, to maintain this relation of the cranks and virtually connect one set of cranks with the other so that the engines will work in harmony, we employ a counter-shaft 64 journaled in suitable bearings 65 in the engine casing 47 and having two gear wheels 66, 67 which mesh with pinions 68, 69 on the crank shafts 56 of the two engines. From the shaft 64 the sprocket wheels 5, 7, derive power through the intermediary of two large gears 70, 71 secured to shaft 10 and meshing with pinions 72, 73 on the counter-shaft 64. The gears 66, 67 are within the engine casing 47 and the gears 70, 71 are partially within extensions 74, 75 on the end of said casing and partially within caps 76, 77 respectively secured to said extensions 74, 75 and being of a width sufficient only to accommodate the gears 70, 71 so as to leave the sprockets 5, 7 exposed and make room between them for the passage of the conveyer with its buckets and picks.

During the excavating action of the machine, it is necessary to run the engine in but the one direction, but should the picks or buckets encounter an obstruction of abnormal resistance liable to damage the machine, it might be necessary not only to stop the engine but to reverse it in order to overcome the acquired momentum or inertia of the moving parts, and as this, to be effective, should be done suddenly, we interpose between the slide valve of each engine and the seat thereof a reversing block 78, as shown in Fig. 8, the slide valve being shown at 79, the valve seat at 80 and the rod which actuates the reversing block 78 at 81. These two rods 81 of the two engines are connected to the same rocker shaft 82 extending athwart the engine casing 47 and having two crank arms 83 which engage pins 84 on the rods 81 whereby both rods may be actuated by one and the same movement of the shaft 82. The latter may be rocked from either side of the machine by levers 85, 86.

By the means described, it will be seen that the engine and vital parts of the mechanism are entirely inclosed within the engine casing 47 which may be provided with a cover or removable lid 87 to render the internal parts accessible.

The machine is mounted in such a way that it may be transported bodily and to that end is mounted upon wheels 88 for which, if desired, may be provided a suitable railway 89, and the machine is also adjustable forward and back independently of the transporting wheels 88 and movable on a vertical axis for driving it into the earth in the desired direction, and at the desired depth of cut. We will now describe the means whereby these movements may be accomplished. The carriage frames 46 are supported upon or formed on a bed 90, and this in turn has sliding connection with a turn-table 91 in any suitable way as by means of dovetail ribs 92 seated in a dovetail cut 93 in the upper surface of turn-table 91 so that the bed 90 may slide in a longitudinal direction for following up the action of the excavating buckets. The turn-table 91 has a central pivot 94 journaled in frame 95 of the truck constituted by said frame and the wheels 88, and if desired the bottom of turn-table 91 may be supported in a suitable anti-friction step 96 on said truck so that the bed 90 may be turned freely on its vertical axis for changing the direction of the cut. The longitudinal movement of the bed 90 for forcing the excavating buckets and picks into the earth may be conveniently produced by a fluid pressure mechanism, such for example, as compressed air, and to that end we mount upon the bed a pair of air cylinders 97, two being employed for the sake of having the requisite piston area in the limited space available below the engine casing and line of travel of the buckets and picks, and to increase this space as far as feasible, the lower fold of the conveyer chains is deflected upwardly where it passes over the cylinders 97, by means of curved guide-ways 98 upon which the rollers 13, 14 travel. The piston rods 99 of these air cylinders are connected in any suitable way to the turn-table 91 as by means of upwardly bent arms 100 whose ends pass under the bed 90 and are situated in the dovetail 93 which is wider than the dovetail guides 92 as appears in Fig. 11. Hence, it will be seen that when air is admitted to the cylinders at one end the excavator buckets will be pushed into the earth and when admitted to the opposite ends they will be withdrawn. The engines may be driven also by the same form of fluid-pressure, if desired, and preferably by compressed air to avoid the objectionable exhaust when the apparatus is used below ground.

In order that the turn-table 91 may be rotated at will for changing the direction of cut, it is provided with a worm-wheel 101 and the truck frame with a worm 102 engaging therewith and having a turning head 103 by which the worm may be rotated.

It is quite obvious that during the operation of a machine of this character, the buckets and picks are frequently liable to encounter obstructions of such character as to cause the excavator boom or frame to be deflected sharply to one side on its vertical pivot, and in order that damage may not result from such an unforeseen shock, the worm 102 is only yieldingly held against movement in either direction longitudinally so as to allow for a limited rotation of the turn-table independently of rotary movement of the worm 102. To that end, therefore, shaft 104 to which the worm is rigidly secured is slidable longitudinally in its bearings 105 and between the ends of the worm and these bearings are interposed suitable cushions or springs 106, 107 so as to hold the worm central under ordinary conditions and use. These springs may, if desired, be housed in sleeves 108 which are slightly shorter than the springs recoiled and into which the hubs of the worm project for compressing the springs.

Should the excavator buckets encounter an obstruction "end on" so to speak tending to force them directly backwards, and which might be damaged if they did not yield, the entire superstructure of the apparatus will yield bodily against the air in the cylinders 97, which it is understood is of sufficient pressure to hold the buckets into the earth during the ordinary excavating operation but will yield when such an abnormal resistance is met with.

The vertical oscillation of the excavator boom or frame on its trunnions 43 is controlled and produced by a worm 109 mounted in suitable bearings 110 on the frame 46 and engaging with a segment rack 111 secured to the underside of the engine casing or other part of the conveyer supporting frame. It is shown as attached by means of a flange 112 to one of the lower angle bars 18. This worm 109 has a shaft 113 provided with a turning head 114 and in order that it may yield like the worm 102 in the event the excavator buckets meet an obstruction of sufficient resistance to elevate the lower end of the conveyer frame, and which might result in damage to the mechanism if not yielded to, it is cushioned on both sides or otherwise yieldingly held against movement in either direction. The desired end may be accomplished by the same form of mechanism as that employed for the worm 102, and which as better shown in Fig. 15, consists of two springs 115, 116 interposed between the hubs 117 of the worm and the bearings 110, the springs being housed in sleeves 118 if desired.

When in use the truck may be anchored to the track 89 by suitable clamps or hooks 119 to render the truck stationary and afford the requisite resistance for forcing the buckets and picks into the earth, and which hooks may be removed to permit the truck to follow up as the excavation proceeds.

Having thus described our invention, what we claim as new therein and desire to secure by Letters Patent is:

1. In a machine for the purpose described, the combination of an approximately horizontal excavator frame, a conveyer movable longitudinally thereof and comprising buckets and shields placed between and movable with said buckets and means mounted under said shields for driving said conveyer.

2. In a machine for the purpose described the combination of an excavator frame, a motor mounted thereon, and an endless conveyer mounted on said frame and surrounding said motor and operatively connected with said motor.

3. In a machine for the purpose described, the combination of an excavator frame pivoted on a horizontal axis and also rotatable laterally, a conveyer movable lengthwise of said frame and a motor connected with said conveyer and also mounted on said frame.

4. In a machine for the purpose described, the combination of an excavator frame, a truck on which said conveyer frame is mounted and with reference to which said frame is movable bodily horizontally, a conveyer movable longitudinally of said frame and means for driving said conveyer.

5. In a machine for the purpose described, the combination of an excavator frame, a truck on which said frame is mounted and with reference to which it is movable bodily horizontally, yielding means for moving said frame horizontally, mounted on said truck, and means for driving said conveyer.

6. In a machine for the purpose described, the combination of an excavator frame, a truck, a conveyer carriage carrying said frame and slidably mounted on said truck, an elastic fluid motor connected with said truck and carriage respectively for moving said carriage horizontally on said truck, a conveyer on said frame and means for driving said conveyer.

7. In a machine for the purpose described, the combination of an excavator frame movable vertically on a horizontal axis, yielding means for adjusting said frame in a vertical direction, a conveyer mounted on said frame and means for driving said conveyer.

8. In a machine for the purpose described, the combination of a laterally oscillatory excavator frame, yielding means for holding said frame against lateral motion, a conveyer on said frame and means for driving said conveyer.

9. In a machine for the purpose described, the combination of a laterally movable excavator frame, means for adjusting said frame laterally comprising a yielding medium, a conveyer on said frame and means for driving said conveyer.

10. In a machine for the purpose described, the combination of a laterally movable excavator frame, yielding means for adjusting said frame laterally, comprising a worm and segment rack engaging each other and springs for holding said worm against longitudinal movement, a conveyer on said frame and means for driving said conveyer.

11. In a machine for the purpose described, the combination of a vertically oscillatory excavator frame, yielding means for adjusting said frame vertically comprising a worm and segment rack engaging each other and springs for holding said worm against longitudinal movement, a conveyer on said frame and means for driving said conveyer.

12. In a machine for the purpose described, the combination of a truck, a turn-table rotatable on said truck independently thereof, a worm and worm-wheel one of which is mounted on said truck and the other on the turn-table, engaging with each other, an excavator frame mounted on said turn-table, a conveyer on said frame, and means also on said frame for driving said conveyer.

13. In a machine for the purpose described, the combination of an excavator frame pivoted on a horizontal axis, an adjustable support arranged to rest upon the ground at the outer end of said frame for gaging the depth of cut, and a conveyer operative longitudinally of said frame.

14. In a machine for the purpose described, the combination of an excavator frame comprising a motor casing, a support on which said casing is pivoted on a horizontal axis, a motor arranged in said casing and a conveyer mounted on said frame and surrounding said casing and operatively connected with said motor.

15. In a machine for the purpose described, the combination of two engines arranged side by side and each comprising its individual crank shaft, a counter-shaft, power transmitting mechanism connecting said counter-shaft with said crank shafts respectively whereby the relative positions of the crank shafts is maintained, a conveyer frame and a conveyer mounted thereon and operatively connected with said counter-shaft.

16. In a machine for the purpose described, the combination of two engines arranged side by side and comprising two crank shafts individual to said engines and independent of each other and each having two cranks, a piston for each engine and connections between each piston and two of said cranks on the same crank shaft, a counter-shaft operatively connected with both of said crank shafts, a conveyer and means operatively connecting said conveyer with said counter-shaft.

17. In a machine for the purpose described, the combination of a motor casing, a motor mounted therein, a shaft connected with said motor within said casing, pinions on said shaft, extensions at the end of said casing in line with said pinions, a second shaft extending across said extensions and arranged without said casing, gear wheels on said second shaft engaging said pinions, caps on said extensions respectively inclosing the outer sides of said gear wheels, a sprocket on said second shaft between said extensions, and a conveyer comprising a sprocket chain running over said sprocket.

HOWARD GREER, Jr.
JAMES R. THOMPSON.

Witnesses to signature of Howard Greer, Jr.:
F. A. HOPKINS,
A. UHER.

Witnesses to signature of James R. Thompson:
D. E. BREWER,
J. H. CLEMENT.